March 17, 1953 R. H. WATTERLOHN 2,631,789

MAGNETIC RECORDING APPARATUS

Filed Dec. 19, 1946 2 SHEETS—SHEET 1

INVENTOR
Roy H. Watterlohn
BY John F. Eakins
ATTORNEY

March 17, 1953 R. H. WATTERLOHN 2,631,789

MAGNETIC RECORDING APPARATUS

Filed Dec. 19, 1946 2 SHEETS—SHEET 2

INVENTOR
Roy H. Watterlohn
BY John F. Eakins
ATTORNEY

Patented Mar. 17, 1953 2,631,789

UNITED STATES PATENT OFFICE 2,631,789

MAGNETIC RECORDING APPARATUS

Roy H. Watterlohn, Chicago, Ill., assignor to J. P. Seeburg Corporation, Chicago, Ill., a corporation of Illinois Application December 19, 1946, Serial No. 717,287

8 Claims. (Cl. 242—54)

This invention relates to magnetic recording apparatus adapted to handle magnetic recording medium such as steel wire for wind and rewind. Such apparatus may conveniently be employed for making recordings, or playing records, or both.

In such machines the wire is transferred from one reel to another, passing through a recording or pickup head so that signal may be applied to or picked up from the wire as it passes from one reel to the other. After the length of wire has been recorded or reproduced it has been transferred from the supply reel to the takeup reel and before it can again be played the wire must be rewound back onto the supply reel. Thus, during "Wind," the takeup reel is driven and during "Rewind," the supply reel is driven in the opposite direction.

Machines of this type have presented considerable difficulties owing to the nature of the magnetic medium. This medium may be steel wire of three or four thousandths of an inch in diameter. The wire is quite springy and is apt to expand off the reels if it is permitted any degree of freedom. Care must be taken that the wire is not snarled or bent sharply since it is quite liable to break during use at a location where it has been sharply bent. Furthermore, the securement of a free end of the wire to a takeup reel, for example, presents considerable difficulties. In accordance with the present invention I preferably secure one free end of the wire to the supply reel and I secure to the other free end of the wire a flexible leader, preferably a cord of nylon material, and I make this leader of sufficient length at all the operations of securing the wire to the takeup reel are performed by manipulation of the leader. At the end of the rewind operation, brakes are applied in known manner to the reels and the motor which drives them. This application of brakes normally applies a considerable tension on the flexible member between the two reels. I prefer to apply the brakes and stop the machine at a time when the leader extends between the two reels and is preferably wound up upon the supply reel for several turns so that the leader and not the wire takes the arresting tension. In fact, I may so arrange the mechanism that the final stoppage of the supply reel is effected by tension developed in the leader.

One of the objections heretofore presented by common methods of securing the free end of the wire to the takeup reel is that objectionable irregularities are incurred on the surface of the wire receiving recess to the takeup reel. Thus, if the free end of the wire is secured to the takeup reel by a piece of Scotch tape as is usual in this art, the piece of tape puts the receiving reel out of round so that irregularities in speed of the wire and wows are introduced into the signal which is recorded or which is reproduced. The leader is of substantial diameter compared with that of the wire. Consequently, if the leader were to be wound up on the wire receiving surface of the takeup reel, very considerable variations of wire speed would be engendered. In accordance with the present invention I provide on the takeup reel a separate means for receiving the leader so that the wire receiving portion of the takeup reel is maintained in its normally round condition.

The present invention also comprises a simple means for securing the free end of the leader to the takeup reel.

A pronounced disadvantage of machines of this general type has been that when the medium is rewound onto the supply reel and that reel has to be removed from the machine for replacement, it has been necessary to hold the medium upon the takeup reel against expansion. Consequently, the removal of the takeup reel required a high degree of manual dexterity. The free end of the wire had to be held and maintained taut with one hand while the takeup reel was removed from the machine with the other. Then the extremity of the wire had to be wound up on the takeup reel and its free end secured thereto in some way always maintaining the wire taut between the operator's two hands. In accordance with the present invention I am able to provide a long length of leader so that several turns are wound upon the takeup reel over the wire thereon. Consequently, the free end of the wire is firmly secured by the snubbing action of the leader and the takeup reel can be removed from the machine without any necessity of holding the leader taut. The rest of the leader may then be wound upon the takeup reel and its free end may be secured to the takeup reel, preferably in the manner hereinafter illustrated.

Another advantage of my invention resides in its ease of loading. A new supply reel may be mounted on the machine, the free end of the leader may be disengaged therefrom and may be very simply secured to the takeup reel. Part of the leader may be left in the form of a free loop since remaining turns of the leader on the takeup reel definitely anchor the wire on the supply reel. The motor may now be started with the result that the takeup reel is driven so as to take up the loop referred to, drawing the leader into engagement with the head. As the motor continues to operate, the leader is taken up into the leader receiving means and thereafter the wire is taken up by the wire receiving portion of the takeup reel so that the machine is driven for recording or reproduction as desired by the operator.

The invention will readily be understood from the following description of a preferred embodiment thereof taken in conjunction with the accompanying drawings in which Figure 1 is a plan view of a wind and rewind machine embodying my invention;

Figure 1:
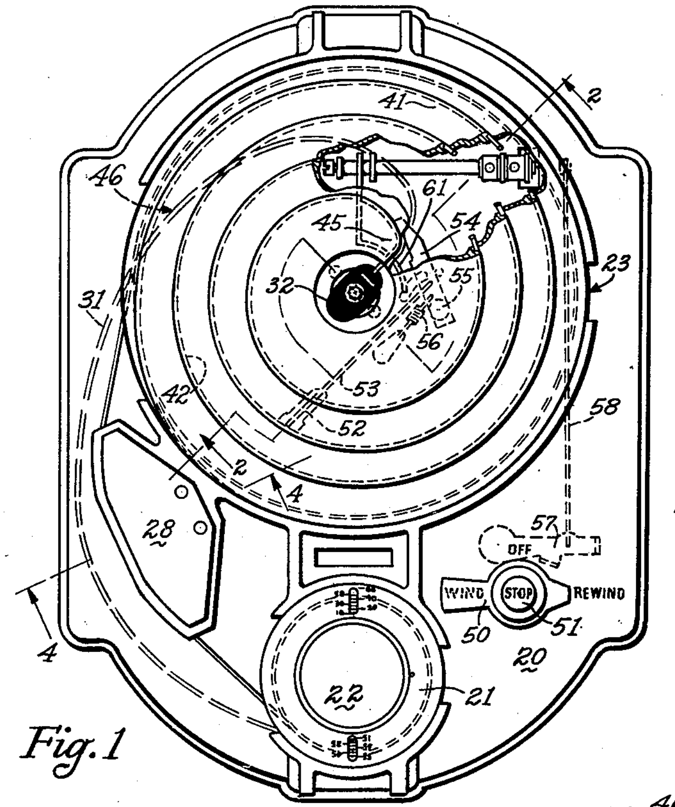
Figure 4:
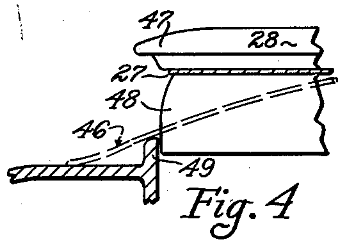
Fig. 4 is a fragmentary sectional elevation taken on the line 4—4 of Figure 1.
Figure 5:
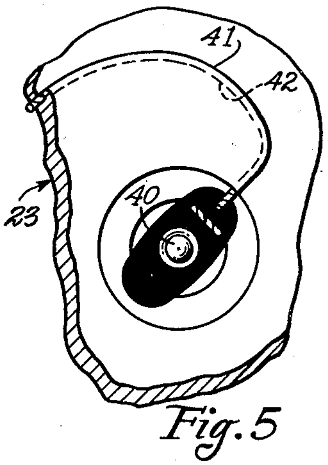
Fig. 5 is a fragmentary plan view on an enlarged scale of the central portion of the takeup reel.

The present invention is illustrated as applied to the machine described and claimed in the copending application of Hugh H. Davis, Serial No. 711,543, filed November 22, 1946, which is hereby included in the present application by reference.

Referring to the drawings, the machine as a whole is mounted on a base 20 by means of which it may be mounted on a panel in a cabinet. The supply reel 21 is removably mounted on a rotatable head 22. The takeup reel 23 is rigidly mounted on a rotatable spindle 24. The supply reel and the takeup reel are provided with circular wire receiving recesses 25 and 26, respectively. These wire receiving recesses are of the same height and are in alignment when the reels are mounted on the machine. Between the two reels, the wire is received in a slot 27 of a head 28. When thus located, the wire is arranged to cooperate with an eraser electromagnet and another electromagnet which is arranged to serve as a recording magnet or pickup magnet depending upon the manner in which the machine is intended to be operated at the moment. The head 28 is oscillated up and down when the machine is in operation so as to distribute the wire evenly upon the reel which is receiving it, the head 28 moving up and down so that its slot 27 oscillates within the upper and lower limits of the wire receiving recesses 25 and 26.

Figures 6, 8:
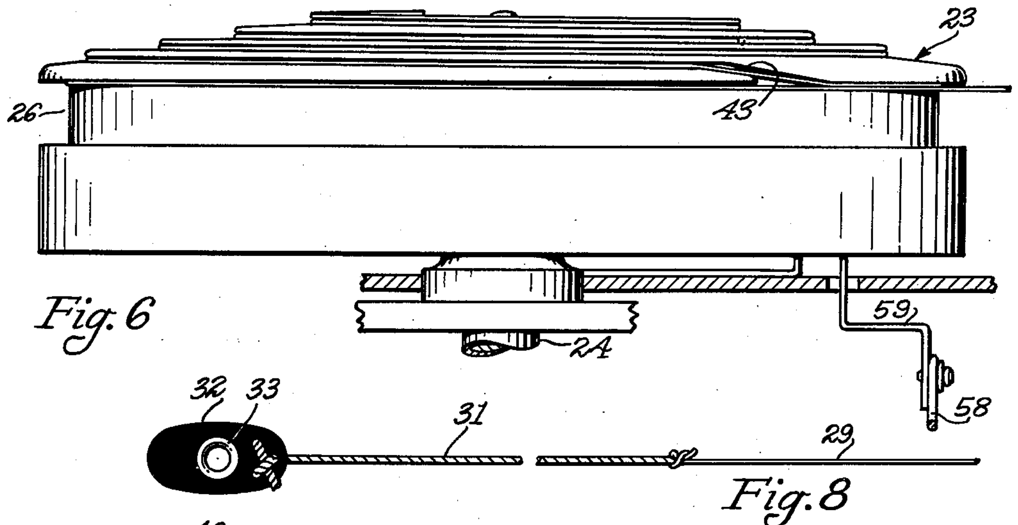
Fig. 6 is an elevational view of the takeup reel.
Fig. 8 is a plan view of the free end of the wire, the leader attached thereto and the securing element at the free end of the leader.
Figure 7:
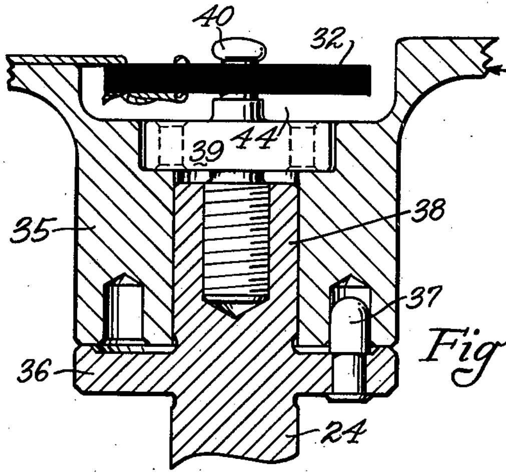
Fig. 7 is a fragmentary elevation on a larger scale of the hub of the takeup reel and associated parts.
Figure 9:
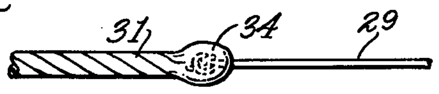
Fig. 9 is a fragmentary view showing a modified form of the connection between the wire and leader.

One end of the wire 29 is secured to the supply reel 21. Thus, this end of the wire may be brought through a small opening in the upper surface of the reel 21. The projecting end of the wire may be knotted and a bead of plastic material 30 may be formed on the knot. I find that the plastic nylon may be melted and applied to the knot in the form of a globule 30 to provide an excellent anchorage for the wire on the reel 21 without the necessity of making the opening in the reel critically small. It is to be noted that by this method of attachment the wire receiving recess 25 is maintained in its normally round condition of reception of the wire to be wound up on this reel. The wire 29 is quite long. The machine illustrated is intended for 50 or 60 minutes play with wire having an average speed of two feet per second. Thus, the length of wire may be over seven thousand feet. The free end of the wire may be knotted or otherwise secured to a leader 31 which is preferably a round cord spun from nylon fibers. The leader may be any suitable cord or it may be a tube or thread of plastic or other suitable material. The principal characteristics of the leader are that it should be strong and that it should be flexible and should lack springiness which might cause it to unwind from a reel in the same manner as fine steel wire tends to unwind. The leader should be relatively long and its desirable degree of length will be hereinafter later described. The leader 31 is secured to a securing element 32. My preferred securing element is a block of rubber or similar flexible material provided with an eyelet 33. The leader 31 may be secured to the block 32 in any suitable manner. One convenient manner is shown in Fig. 8, the end of the leader being threaded through three openings in the block 32, the extremity of the leader being engaged between the block and a loop formed between two of the openings. Another suitable way of securing the wire 29 to the leader 31 is shown in Fig. 9. One of the advantages of using a leader 31 of plastic material such as nylon is that I can melt the end of the leader to form a globule 34, insert the knotted wire 29 in the globule and allow the globule to cool, thus making a very strong connection which is devoid of any projections.

The takeup reel 23 is provided with a central boss 35 which is arranged to seat on a flange 36 on the spindle 24. A dowel pin 37 extends into an opening in the boss 35. An extension 38 of the spindle 24 projects upwardly into the central opening of the boss 35. The reel 23 is rigidly secured to the shaft 24 by means of a bolt 39 which is threaded into an axial opening in the extension 38 of the spindle 24. The head of the bolt 39 is located in a central recess on the upper surface of the reel 23 and a stud 40 projects upwardly therefrom. This stud is arranged for the application of the eyelet 33 of the block 32. The arrangement is such that when the block is applied on the stud 40 the block is located below the adjacent surface of the reel 23 so that the adjacent portion of the leader is free to rest on the upper surface of the reel 23.

Figures 2, 3:
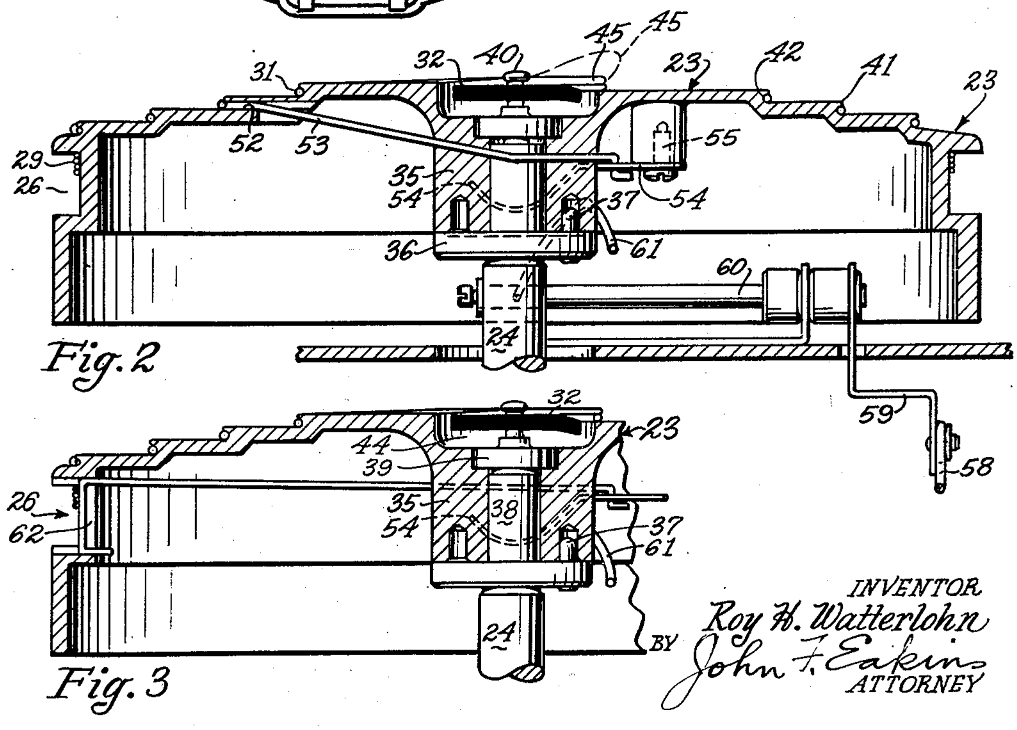
Fig. 2 is a sectional elevation through the takeup reel taken on the irregular line 2—2 of Figure 1.
Fig. 3 is a similar sectional fragmentary elevation of a modified form of takeup reel.

The upper surface of the takeup reel 23 is slightly coned and on this upper surface is provided a spiral formation 41 which gives the upper surface a stepped or terraced appearance when viewed in section as in Fig. 2. The spiral formation 41 is provided with an outwardly directed groove or recess 42 for the reception of the leader 31. The outer end of the recess 42 leads into a slot 43 which extends into the wire receiving recess 26 at the base thereof. As best seen in Fig. 6, the slot 43 provides a continuous path from the wire receiving recess 26 into the spiral recess 42. The inner end of the recess 42 terminates at the central recess 44 in the boss 35 of the reel 23, this being the recess in which the stud 40 and the block 32 are located. At the inner end of the recess 43 the spiral formation 41 provides a brow 45. This brow may be in the form shown in full lines in Fig. 2, but it may be made more substantial and more overhanging in the manner shown in phantom lines on this figure. I prefer to maintain this brow rather low to avoid accidents to the fingers of the operator or of children who might bring their fingers into the path of the brow when the reel 23 is rotating at high speed.

Figure 10:
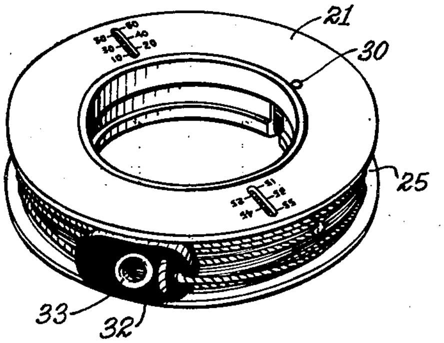
Fig. 10 is a perspective view of the supply reel in its normal condition removed from the machine.

The supply reel is normally stored in the condition shown in Fig. 10 with the wire completely wound on the reel and the leader wound over the wire with a relatively large number of turns. The block 32 is of such width that it is retained between the flanges of the reel 21 resiliently by the natural resilience of the block 32. To load the machine the block 32 is disengaged from the flanges of the reel 21 and the reel 21 is applied to the head 22. Sufficient leader is pulled off the reel 21 to enable the block 32 to be applied to the stud 40 and the leader is located in the form of a loop 46 shown in phantom lines on Figure 1. The pickup head 28 is provided with an outwardly directed overhanging brow 47 above its slot 27 and below this slot it is provided with a depending portion 48 which cooperates with a flange 49 on the base 20 in such manner that the depending portion 48 never clears the flange 49. It will readily be understood that when the machine is put into "Wind" condition the reel 23 is driven in clockwise direction as viewed in Figure 1 and the brow 45 engages the inner end of the loop 46 so that the leader starts winding up in the recess 42 taking up the loop 46. This brings the leader automatically into the slot 27 of the head 28 and a continued winding up of the leader in the recess 42 unreels the leader from the supply reel 21 until all the leader is wound up in the recess 42 on the upper surface of the reel 23. The joint between the wire and the leader 31 is arranged to become located on a portion of the recess 42 near the slot 43. Consequently, the small portion of the wire is also wound into the recess 42, then a portion is led into the slot 43 and thereafter the wire is wound up in the wire receiving recess 26, being evenly distributed therein by the oscillation of the head 28.

During rewind the reel 21 is driven in the counterclockwise direction and the wire is transferred from the wire receiving recess 26 into the wire receiving recess 25 of the reel 21. As will hereinafter be explained, when part of the leader 31 has been unwound from the recess 42 and several convolutions of the leader have been applied to the reel 21 over the wire wound thereon, the drive is terminated and brakes are applied to the rotating elements. When these elements are brought to a complete stop most of the leader 31 has been unwound from the reel 23 and, in fact, the final arrestment of the reel 21 may be brought about by the leader 31 attaining a radial position out to the head 28. Consequently, the unloading may be completed by removing the block 32 from the stud 40, removing the reel 21 from the head 22 and winding up the free end of the leader on the reel 21 and forcing the block 32 into its position shown in Fig. 10.

As in the machine described and claimed in the co-pending application referred to above, the machine is controlled by a single control member 50 which is biased to an intermediate "off" position. When the control member is rotated to the "Wind" position the motor is started and the machine is conditioned so that it drives the spindle 24 and the reel 23. When the control member 50 is rotated to the rewind position as shown in Figure 1, the motor is started and the machine is conditioned to drive the head 22 and the reel 21. A "Stop" button 51 is provided and when this button is actuated the control member 50 snaps to the "Off" position opening the motor switch and applying the brakes. As in the application referred to, means associated with the head 22 are provided for releasing the control member 50 when the wire is approaching depletion from the reel 21 near the end of the "Wind" operation, again with the result that the motor switch is opened and brakes are applied to the moving elements. Likewise, means are associated with the reel 23 effective near the end of the rewind operation for releasing the control member 50 with the result that the motor switch is opened and the brakes are applied to the rotating elements. Since this last mentioned means is somewhat different from the corresponding means in the application referred to, it will now be described briefly. At an intermediate point of the recess 42, I provide an opening 52 through which the end of a rod 53 projects into the recess 42. The arrangement is such that when the leader is wound on the recess 42 across the outer end of the opening 52 the rod 53 is forced to the right as is best seen in Fig. 2. The rod 53 is pivotally connected to a lever 54 which is pivotally mounted on the underside of the reel 23 at 55. A relatively weak spring 56 biases the rod 53 outwardly. The lever 54 and the rod 53 are balanced centrifugally so that the spring 56 biases the rod 53 outwardly with substantially uniform force irrespective of the speed of rotation of the reel 23. As in the application referred to, the control member 50 is held in "Rewind" position by means of a latch 57. This latch is connected by a link 58 to a crank arm 59 which is secured to a shaft 60, rotatably mounted on the frame of the machine. At its near end the shaft 60 carries a cam arm 61 which is located quite close to the hub 35 of the reel 23. When the latch 57 is in its latched position holding the control member 50 in "Rewind" position, the cam arm 61 is elevated. In all other positions of the control member the cam arm is in a lower position. During "Rewind" the lever 54 is held away from the position of the cam arm 61 by the leader 31 pressing against the outer end of the rod 53. When all the wire has been rewound on the reel 21 and several turns of the leader have been wound on top of the wire, the leader clears the end of the rod 53 so that this rod is projected outwardly by the spring 56 thus bringing the lever 54 into engagement with the cam arm 61, depressing the cam arm and withdrawing the latch 57 upwardly as viewed in Figure 1 so that the control member moves to "Off" position. The motor circuit is opened and brakes are applied to the motor and to the elements carrying both reels and the idlers which drive the reels are disconnected from the motor and the drive elements with which they cooperate in the manner described in the co-pending application referred to above. It is to be noted that after the rod 53 is freed to project outwardly, the machine coasts to a stop and practically all of the leader is unwound from the reel 23. In fact, it is not objectionable if all the leader is taken out of the recess 42 leaving the terminal end of the leader in radial position from the stud 40 to the head 28 since the leader is capable of standing considerable tension.

One of the advantages of having several turns of leader on the reel 21 before the brakes are applied is that the medium between the two reels normally is subjected to a relatively strong pull and with several turns of leader snubbed around the wire on the reel 21 all the pull is taken by the leader. Consequently, the improved machine does not need as accurate adjustment as when the braking strain is taken by the wire.

It is again emphasized that my wire receiving recess 26 is maintained in perfect circular condition, which is a great advantage in the attainment of uniform wire speed. In one aspect of my invention I provide a separate wire receiving and leader receiving means. If desired, I may modify the takeup reel 23 in the manner illustrated in Fig. 3. In this case the rod 53 extends into a slot 62 which extends across the wire receiving space 25 of the reel. The rod 53 is formed so that it extends across the whole face of the wire receiving recess 26. It will readily be understood that immediately all the wire is removed from the wire receiving recess 26 of the reel 23 the rod 53 is free to move outwardly, releasing the control member 59 and bringing the machine to a stop in the manner previously described.

While I prefer to employ a leader in view of the many advantages heretofore pointed out, it may be understood that my invention is not intended to be limited to that feature since the securing means 32 may be secured to the end of the wire and employed in this machine without a leader. It is, however, very much preferred to employ a leader.

Although the invention has been described in connection with the specific details of a preferred embodiment thereof, it must be understood that such details are not intended to be limitative of the invention except in so far as set forth in accompanying claims.

Having thus described my invention, I declare that what I claim is:

1. In a wind and rewind machine for handling magnetic recording medium, a supply reel, a takeup reel having a peripheral medium receiving recess, a helical track on said takeup reel separate from said recess for receiving a definite length of flexible material, one end of said track extending into said recess, a stud adjacent the other end of said track for securing a perforated member connected to the end of said flexible material, a brow on said takeup reel adjacent the end of the track remote from said recess, for engaging a portion of said flexible material extending from said stud for leading the flexible material into last mentioned end of the track when the takeup reel is driven, whereby the flexible member is located on the track and the medium is wound up in said recess.

2. In a wind and rewind machine for handling magnetic recording medium, a supply reel, a takeup reel having a peripheral medium receiving recess, a helical track on said takeup reel separate from said recess for receiving a definite length of flexible material, one end of said track extending into said recess, magnetic medium wound on said supply reel, a leader secured to said wire, means for securing said leader to the takeup reel adjacent the other end of said track, said track being sufficiently long to receive all of the leader so that only magnetic medium is received in said medium receiving recess, means for driving said takeup reel for wind and the supply reel for rewind, and means at an intermediate position of said track arranged to be engaged by the leader, and means controlled by the last mentioned means for terminating the drive when said means is disengaged by the partly unwound leader during rewind.

3. In a wind and rewind machine for handling magnetic recording medium, a supply reel, a takeup reel having a peripheral medium receiving recess, a helical track on said takeup reel separate from said recess for receiving a definite length of flexible material, one end of said track extending into said recess, magnetic medium wound on said supply reel, a leader secured to said wire, means for securing said leader to the takeup reel adjacent the other end of said track, said track being sufficiently long to receive all of the leader so that only magnetic medium is received in said medium receiving recess, means for driving said takeup reel for wind and the supply reel for rewind, and means at an intermediate position of said track arranged to be engaged by the leader, and means controlled by the last mentioned means for terminating the drive when said means is disengaged by the partly unwound leader during rewind, said means being located at a position which ensures that the medium and a portion of the leader is wound on the supply reel when said means is disengaged.

4. In a wind and rewind machine for recording wire, in combination, a supply reel, a takeup reel, means for driving either reel for wind and rewind, a wire receiving recess on said takeup reel, a helical-spiral formation on one face of the takeup reel, providing a helical-spiral track for receiving leader secured to the wire, one end of said track extending into the wire receiving recess, a stud at the center of said takeup reel arranged for the reception of an opening in a block secured to said leader, a brow on said takeup reel adjacent the other end of the track and said stud, arranged to lead the leader into the track when the takeup reel is driven, a member engaged by the wire in the wire receiving recess, and means actuated by said member when it is disengaged by the substantially complete depletion of the wire from said recess during rewind for terminating the drive of the supply reel.

5. In a wind and rewind machine for recording wire, in combination, a supply reel, a takeup reel, means for driving either reel for wind and rewind, a wire receiving recess on said takeup reel, a helical-spiral formation on one face of the takeup reel, providing a helical-spiral track for receiving leader secured to the wire, one end of said track extending into the wire receiving recess, a stud at the center of said takeup reel arranged for the reception of an opening in a block secured to said leader, a brow on said takeup reel adjacent the other end of the track and said stud, arranged to lead the leader into the track when the takeup reel is driven, a member engaged by the leader at an intermediate point on said track, and means actuated by said member when it is disengaged by the leader during rewind for terminating the drive of the supply reel.

6. In a wind and rewind machine for recording wire, in combination, a supply reel, a takeup reel, means for driving either reel for wind and rewind, a wire receiving recess on said takeup reel, a helical-spiral formation on one face of the take-up reel, providing a helical-spiral track for receiving leader secured to the wire, one end of said track extending into the wire receiving recess, a stud at the center of said takeup reel arranged for the reception of an opening in a block secured to said leader, a brow on said takeup reel adjacent the other end of the track and said stud, arranged to lead the leader into the track when the takeup reel is driven, a member engaged by the leader at an intermediate point on said track, and means actuated by said member when it is disengaged by the leader during rewind for terminating the drive of the supply reel, said leader and said track being sufficiently long and said member being located at such position on the track that all the wire has been rewound, a plurality of turns of leader are wound on the supply reel, and several turns of leader remain on the track when the drive is terminated.

7. A take-up reel for magnetic medium having a peripheral medium receiving recess, a side of generally coned formation and having a helical track outwardly directed in the radial direction extending from the base of said recess around the conical formation and substantially towards the center of the reel, and means substantially at the center of said reel for attaching a leader thereto.

8. A take-up reel for magnetic medium having a peripheral medium receiving recess, a side of generally coned formation and having a helical track outwardly directed in the radial direction extending from the base of said recess around the conical formation and substantially towards the center of the reel, means substantially at the center of said reel for attaching a leader thereto, and an overhanging brow formation at the inner end of said track arranged to engage said leader and lead it into said track.

ROY H. WATTERLOHN.

REFERENCES CITED

The following references are of record in the file of this patent:

UNITED STATES PATENTS

| Number | Name | Date |
|---|---|---|
| 663,605 | Frankham | Dec. 11, 1900 |
| 852,148 | Tucker | Apr. 30, 1907 |
| 1,560,721 | O'Reilly | Nov. 10, 1925 |
| 1,625,503 | Schooley | Apr. 19, 1927 |
| 1,881,383 | Wylie | Oct. 4, 1932 |
| 1,939,181 | McCash et al. | Dec. 12, 1933 |
| 1,943,453 | Norling | Jan. 16, 1934 |
| 2,084,134 | Dunkerke | June 15, 1937 |
| 2,091,756 | Fodor | Aug. 31, 1937 |
| 2,427,193 | Canfield | Sept. 9, 1943 |
| 2,519,245 | Greenleaf et al. | Aug. 15, 1950 |

FOREIGN PATENTS

| Number | Country | Date |
|---|---|---|
| 125,114 | Australia | Oct. 26, 1931 |